US012770784B2

(12) United States Patent
Fursa et al.

(10) Patent No.: US 12,770,784 B2
(45) Date of Patent: Oct. 20, 2026

(54) INDUCTIVE COMPONENT AND METHOD FOR ADJUSTING AN INDUCTANCE VALUE

(71) Applicant: Philip Morris Products S.A., Neuchatel (CH)

(72) Inventors: Oleg Fursa, Gempenach (CH); Andreas Michael Rossoll, Le Mont-sur-Lausanne (CH); Enrico Stura, Palezieux-Village (CH); Stefan Weber, Regensburg (DE)

(73) Assignee: Philip Morris Products S.A., Neuchatel (CH)

( * ) Notice: Subject to any disclaimer, the term of this patent is extended or adjusted under 35 U.S.C. 154(b) by 918 days.

(21) Appl. No.: 17/761,886

(22) PCT Filed: Sep. 17, 2020

(86) PCT No.: PCT/EP2020/075971
§ 371 (c)(1),
(2) Date: Mar. 18, 2022

(87) PCT Pub. No.: WO2021/053068
PCT Pub. Date: Mar. 25, 2021

(65) Prior Publication Data

US 2022/0336150 A1 Oct. 20, 2022

(30) Foreign Application Priority Data

Sep. 20, 2019 (DE) ..................... 10 2019 125 402.7

(51) Int. Cl.
*H01F 27/36* (2006.01)
*H01F 27/24* (2006.01)
(Continued)

(52) U.S. Cl.
CPC ........... *H01F 41/079* (2016.01); *H01F 27/24* (2013.01); *H01F 27/2823* (2013.01);
(Continued)

(58) Field of Classification Search
CPC .. H01F 27/24; H01F 27/2823; H01F 27/2885; H01F 27/324; H01F 19/02;
(Continued)

(56) References Cited

U.S. PATENT DOCUMENTS 2,976,502 A 3/1961 Hill
3,144,017 A 8/1964 Muth
(Continued)

FOREIGN PATENT DOCUMENTS

AG 206250044 U 6/2017
DE 1 090 817 B 1/1960
(Continued)

OTHER PUBLICATIONS

Israel Office Action issued Dec. 16, 2024 in Israel Patent Application No. 291399, 4 pages.
(Continued)

*Primary Examiner* — Mang Tin Bik Lian
(74) *Attorney, Agent, or Firm* — Oblon, McClelland, Maier & Neustadt, L.L.P.

(57) ABSTRACT

An inductive component is provided, including: a wire winding, around which a magnetic foil is wrapped; an electrical shielding, which surrounds the magnetic foil, the magnetic foil including at least one magnetic layer, the at least one magnetic layer including a magnetic material, and the magnetic material being a nanocrystalline iron alloy; and a non-magnetic and non-conductive insulating layer, which includes a plastic and which is disposed between the magnetic foil and the wire winding. A method for adjusting an inductance value of an inductive component is also provided.

11 Claims, 3 Drawing Sheets

(51) Int. Cl.

| | |
|---|---|
| ***H01F 27/28*** | (2006.01) |
| ***H01F 27/32*** | (2006.01) |
| ***H01F 41/079*** | (2016.01) |
| ***H01F 41/12*** | (2006.01) |

(52) U.S. Cl.
CPC ....... *H01F 27/2885* (2013.01); *H01F 27/324* (2013.01); *H01F 41/125* (2013.01)

(58) Field of Classification Search
CPC . H01F 21/00; H01F 5/02; H01F 17/02; H01F 17/045; H01F 27/366; H01F 27/361; H01F 21/12
See application file for complete search history.

(56) References Cited

U.S. PATENT DOCUMENTS

| | | | | |
|---|---|---|---|---|
| 4,356,468 | A | 10/1982 | van Laar | |
| 5,455,573 | A | 10/1995 | Delatorre | |
| 6,535,095 | B2 * | 3/2003 | Aoki | H01F 27/027 336/200 |
| 6,921,042 | B1 * | 7/2005 | Goodzeit | H02K 55/00 335/214 |
| 9,275,780 | B2 * | 3/2016 | Debray | H01F 41/04 |
| 2004/0263307 | A1 | 12/2004 | Christopherson et al. | |
| 2008/0055034 | A1 * | 3/2008 | Tsunemi | H01F 3/10 336/83 |
| 2014/0239892 | A1 * | 8/2014 | Sawa | H02J 50/12 320/108 |
| 2019/0098805 | A1 | 3/2019 | Woo et al. | |

FOREIGN PATENT DOCUMENTS

| | | | |
|---|---|---|---|
| DE | 30 20 400 | A1 | 12/1980 |
| DE | 3618122 | A1 | 12/1987 |
| DE | 3926231 | A1 | 2/1991 |
| DE | 199 52 192 | A1 | 4/2001 |
| DE | 10 2008 063 312 | A1 | 7/2010 |
| DE | 10 2013 103 268 | A1 | 10/2014 |
| DE | 20 2016 104 063 | * | 9/2016 |
| EP | 0 678 880 | A1 | 10/1995 |
| EP | 1 895 549 | A1 | 3/2008 |
| EP | 3 026 678 | A1 | 6/2016 |
| JP | 50-5850 | A | 1/1975 |
| JP | 59-119708 | A | 7/1984 |
| JP | 60-66804 | A | 4/1985 |
| JP | H05217751 | A | 8/1993 |
| JP | H11195542 | A | 7/1999 |
| JP | 2008-53670 | A | 3/2008 |
| JP | 2009-16563 | A | 1/2009 |
| JP | 2016-136698 | A | 7/2016 |
| JP | 2017-130569 | A | 7/2017 |
| KR | 1998-028930 | U | 8/1998 |
| KR | 10-2014-0109336 | A | 9/2014 |
| KR | 10-2017-0127237 | A | 11/2017 |
| RU | 22 841 | U1 | 4/2002 |

OTHER PUBLICATIONS

Russian Decision on Grant issued Feb. 10, 2025 in Russian Patent Application No. 2022110508/07 (with English Translation), 13 pages.
Combined Chinese Office Action and Search Report issued on Oct. 30, 2024 in Chinese Patent Application No. 202080065650.8 (with unedited computer-generated English translation), 13 pages.
Japanese Office Action issued on Sep. 30, 2024 in Japanese Patent Application No. 2022-517481 (with unedited computer-generated English translation), 11 pages.
Combined Russian Office Action and Search Report issued Jan. 30, 2024 in Russian Patent Application No. 2022110508/07 (with English Translation), 18 pages.
Russian Office Action issued Jun. 19, 2024 in Russian Patent Application No. 2022110508/07 (submitting English Translation only), 5 pages.
European Office Action issued Mar. 1, 2024 in European Patent Application No. 20 775 254.4, 12 pages.
International Search Report issued Nov. 30, 2020 in PCT/EP 2020/075971 filed Sep. 17, 2020, 3 pages.
German Search Report issued Jul. 28, 2020 in German Patent Application No. 10 2019 125 402.7 filed Sep. 20, 2019, 7 pages (with Partial Translation).
Malaysian Examination Report issued Jun. 30, 2025 in Malaysian Patent Application No. PI2022001509, 6 pages.
Chinese Office Action issued Jun. 28, 2025 in Chinese Patent Application No. 202080065650.8 (with English Translation), 11 pages.
Korean Office Action issued Mar. 24, 2025, in corresponding Korean Patent Application No. 10-2022-7013037 (with English Translation), 9 pages.
Philippines Substantive Examination Report issued May 6, 2025, in corresponding Philippines Patent Application No. 1/2022/550549, 7 pages.
Office Action dated Jul. 14, 2026 issued in corresponding Japanese patent application No. 2022-517481 (with English translation).
Office Action dated Apr. 15, 2026, issued in corresponding KR patent application No. 10-2022-7013037 (with English translation).

* cited by examiner

INDUCTIVE COMPONENT AND METHOD FOR ADJUSTING AN INDUCTANCE VALUE

The present invention relates to an inductive component comprising a wire winding. This can be a coil with a magnetic core inside the wire winding or without a magnetic core inside the wire winding.

The inductive component is used in a stereo system, among other things.

For many applications, a precise adjustment of the inductance value of the component, at least on a statistical average for a group of inductances (lot), is desirable. Resonance applications in particular require a highly precise adjustment of the inductance. The component is in particular designed for use in the high frequency range.

The geometric dimensions strongly affect the inductance of electrical components, in particular in the case of air-core coils. Highly precise inductance values can only be produced within certain physical limits and require precise control of the geometry. For inductances with or without a magnetic core, variations in the material properties and the operating temperature lead to a variation of the inductance value as well. The correction of deviations of the inductance value of a finished component from a desired target value is referred to as "adjustment" or "tuning".

Documents DE 36 18 122 A1, DE 39 26 231 A1, DE 199 52 192 A1 and DE 10 2008 063 312 A1 describe adjustable inductive components. An adjustment is usually accomplished by pushing a core of soft magnetic material into or out of the interior of the winding, or by pulling apart or compressing the winding.

It is an object of the present invention to provide an improved inductive component and a method for adjusting an inductance value of an inductive component.

According to a first aspect of the present invention, an inductive component comprises a wire winding. The wire winding is wrapped in a magnetic foil. The magnetic foil can in particular rest directly on the wire winding. An insulating layer can also be disposed between the magnetic foil and the wire winding.

The foil allows a precise adjustment of the inductance of the component after the wire winding has been produced. The foil can be wrapped around the wire winding in a suitable number of turns depending on the desired target value of the inductance. The magnetic thickness of the foil wrap can be increased by increasing the number of turns. The foil thus creates a magnetic body outside the winding, which affects the inductance of the component. For example, the inductance of the component can be changed in the nH range as a function of the magnetic thickness of the foil.

As a winding wire, the wire winding comprises for example a metallic wire, for instance copper, aluminum or silver wire.

The component can comprise a carrier body for the winding wire. In one embodiment, the carrier body is made of a non-magnetic material. This can be a plastic material, for example. There can be no magnetic core within the winding wire. The carrier body thus functions purely as a carrier for the winding wire and does not guide the magnetic flux. In such an embodiment, the inductance is particularly strongly dependent on the geometry, in particular the diameter of the coil, so that the inductance can be greatly influenced by applying the foil in the outer region of the wire winding.

In an alternative embodiment, the carrier body can be made of a magnetic material. This can be a ferrite core, for example. It is also possible for a magnetic core to be disposed within a non-magnetic carrier body.

The magnetic foil can surround the wire winding over the entire length of the winding. The foil can also surround the wire winding in one direction around the winding axis. For example, the wire winding is completely covered by the foil on the outside. The wire winding is wound helically, for example. The wire winding can have the basic geometry of a tube. The magnetic foil likewise has the basic geometry of a tube, for example, in which the wire winding is accommodated. It is also possible that the foil does not completely cover the wire winding. The foil preferably covers at least three quarters of the outer surface of the wire winding. This does not include the ends of the wire, which can project from the wrapped shape.

The magnetic foil can be self-adhesive. This makes it particularly easy to apply the foil.

The foil can alternatively be non-self-adhesive and attached with a bonding agent or by means of heat and pressure.

Prior to application, the foil is provided in the form of a roll for example, and can then be unwrapped from the roll and applied over the wire winding. The foil can, for example, also be provided in the form of a strip.

The foil can be wrapped around the wire winding in one or more layers. The foil has 1 to 10 layers, for instance. The foil has more than one layer, for example, in particular at least two layers. The magnetic thickness of the foil wrap can be increased by increasing the number of layers, thus also increasing the inductance. The layers of the foil can rest directly against one another. If the foil is self-adhesive, the layers can easily be attached to one another.

The foil can also be wrapped around the wire winding in only one layer. It is also possible for the foil to be wrapped around the wire winding in a non-whole number of turns; for example comprise 2.5 layers.

The foil, corresponding to one layer of the foil in wrapped form, has a maximum thickness of 100 lam for instance.

The foil can consist of one or more layers. In particular, one layer of the foil wrap can be single or multilayered. The foil can be configured as a laminate having multiple layers. The layers can be connected to one another with an additional bonding agent or without an additional bonding agent.

The foil comprises at least one magnetic layer, for example. The foil can also comprise a plurality of magnetic layers. The magnetic layer comprises a magnetic material. The magnetic material can be a ferrite material, for example. It can also be pure iron or an amorphous or nanocrystalline iron alloy. It can in particular also be a highly permeable material, for instance having a permeability of $\mu>1000$.

The magnetic material can be embedded in a non-magnetic material, for instance a plastic, in the form of particles. The particles are in particular distributed in the non-magnetic material. The non-magnetic material can also be configured as an adhesive. The non-magnetic material can provide the necessary strength and flexibility for the foil. Such a foil is provided in a cured form, for example, wrapped around the wire winding and then fixed by heating. It is also possible to apply an additional bonding agent.

The magnetic layer can alternatively also be made of the magnetic material. In this case, there are no magnetic particles embedded in a non-magnetic material; rather, the layer is made entirely of the magnetic material. It could be an iron strip, for example. The other materials mentioned above can be used here as well.

In one embodiment, the foil comprises a carrier layer in addition to the magnetic layer. The carrier layer is non-magnetic, for example. The carrier layer comprises plastic, for instance, or is made of plastic. The carrier layer can also comprise an adhesive, in particular a cured adhesive. The magnetic layer is attached to the carrier layer, for example by heating and applying pressure. Alternatively, the magnetic layer is glued to the carrier layer.

The properties of the foil, in particular the strength and flexibility of the foil, can be improved by the carrier layer. In particular in the case of brittle magnetic layers, the carrier layer can ensure the workability of the foil. Alternatively, an adhesive that attaches the foil to the component, can also ensure the cohesion of the foil when cracks develop in the magnetic layer. The adhesive on the component thus assumes the function of the carrier layer. In this case, the foil is provided without a carrier layer, for example, an adhesive is applied to the foil and the foil is wrapped around the wire winding.

It is also possible to have a plurality of carrier layers. For example, one magnetic layer is disposed between two carrier layers.

The inductance of the component is between 1 and 1000 nH, for example. Depending on the design, by varying the number of turns of the foil, it is possible to adjust the inductance in a range of up to 10% of the inductance in 0.1% steps, for example.

An insulating layer can also be provided between the wire winding and the magnetic foil. The insulating layer is in particular non-magnetic and non-conductive.

Furthermore, an electrical shielding, in particular in the form of an electrically conductive material, can be applied over the foil wrap. The electrical shielding may surround the wrapped magnetic foil. The shielding may be in the form of a further foil or a coating, for example. The shielding may comprise a conductive material, for example a metal. For example, a metallic foil, such as copper foil, aluminum foil or tinned copper foil, can be applied over the magnetic foil. The metallic foil can comprise one or more layers. The electrical shielding of the inductive component can thus be ensured. An additional non-conductive foil can optionally be disposed over the shielding for fixation.

According to a further aspect of the present invention, a method for adjusting an inductance value of an inductive component is provided. A wire winding is provided and wrapped with a magnetic foil. The inductance value of the obtained component is influenced by the magnetic foil. A number of layers of the foil can, for example, be selected as a function of a target value of the inductance.

It is also possible, alternatively, or additionally to select the thickness of a magnetic layer of the foil as a function of a desired target value. For example, a number of foils having different thicknesses of a magnetic layer can be provided and one of the foils is then selected depending on a desired target value.

The foil, the wire winding and the inductive component can have all of the properties described above. A magnetic core can be disposed within the wire winding, for example, or no magnetic core can be disposed within the wire winding.

The inductance of the component is measured before or after said component is wrapped with the foil, for example, and the number of layers of the inductive component or a further inductive component is changed as a function of the deviation of the measured value from a target value. The inductance can also be measured indirectly, i.e. a measured value that is a measure for the inductance can be determined.

During the measurement, the foil can still have a part that is not wrapped around the wire winding and projects from the wrapped part. Depending on the measured value, the foil can be wrapped further around the wire winding or the projecting part can be cut off. Alternatively, the unwrapped part can be cut off after wrapping, and another foil can be wrapped on after the measurement.

The number of layers can be increased incrementally until the desired target value is reached. It is also possible to apply incomplete layers. The number of layers is increased incrementally, for example, until the desired target value is reached. Depending on the type of attachment, the number of layers can also be reduced. The number of layers is changed in a range from 1.00 to 10.00 turns, for example.

Overall, the inductance value can easily be adjusted by applying the magnetic foil. An adjustment can in particular also be carried out after or even during the measurement.

After the wrapping of the foil has been completed, i.e. when the target value is reached, an electrical shielding, in particular in the form of an electrically conductive material, can be applied over the foil wrap. The electrical shielding may surround the wrapped magnetic foil. The shielding may be in the form of a further foil or a coating, for example. The shielding may comprise a conductive material, for example a metal. For example, a metallic foil, such as copper foil, aluminum foil or tinned copper foil, can be applied over the magnetic foil. The metallic foil can comprise one or more layers. The electrical shielding of the inductive component can thus be ensured. An additional non-conductive foil can optionally be disposed over the shielding for fixation.

The description of the objects provided here is not restricted to the individual specific embodiments. Rather, the features of the individual embodiments can be combined with one another insofar as technically reasonable.

The objects described here are explained in more detail in the following on the basis of schematic design examples.

The figures show:

FIG. 1 an embodiment of an inductive component in a lateral view,

In the following figures, the same reference signs preferably refer to functionally or structurally equivalent parts of the various embodiments.

Figure 1:
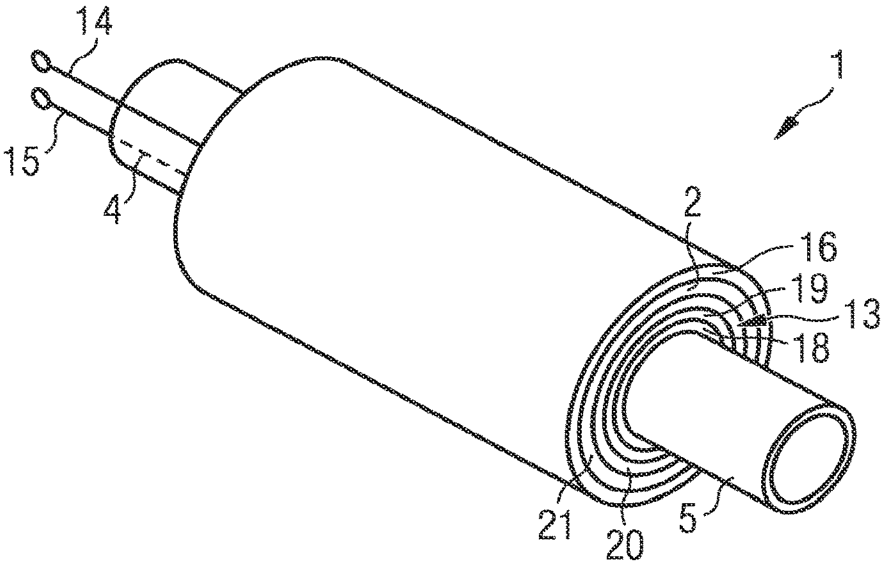
Figure 2:
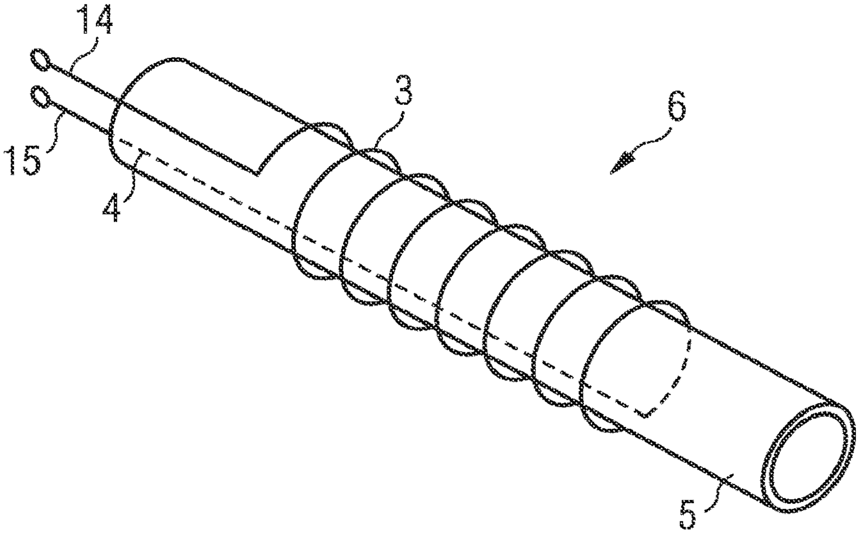
FIG. 2 shows a base body of the component of FIG. 1.

FIG. 1 shows an inductive component 1 comprising a magnetic foil 2 for adjusting the inductance of the component 1. For illustrative purposes, FIG. 2 shows a base body 6 of the component 1 of FIG. 1, i.e., still without the wrapping with the foil 2.

The component 1 comprises a winding 3 (see FIG. 2) of a wire 4. The winding 3 is wrapped around a carrier body 5.

The carrier body 5 can, for example, be configured as a magnetic core. The carrier body 5 can be configured as a ferrite core, for example. The carrier body 5 can also be non-magnetic. In this case, a magnetic core can be disposed within the carrier body 5.

The base body 6 can alternatively be configured as an air-core coil. In this case, the carrier body 5 is non-magnetic and there is also no magnetic core in the carrier body 5.

The carrier body 5 can also be referred to as a coil former, the inductive component 1 as a coil.

The carrier body 5 comprises plastic, for example. The carrier body 5 is produced in an injection molding process, for example.

The wire 3 is configured as a copper wire, for instance. It can also be an aluminum, silver or gold wire. The wire can be insulated, for example with a lacquer. To improve the solderability and/or tendency to oxidize, the wire, in particular in the case of aluminum or copper, can be coated with other metals such as tin, silver, nickel or gold.

In the present case, the carrier body 5 has a circular cylindrical shape. The carrier body 5 can also have a different shape, for instance a cuboid shape. The carrier body 5 can also be a part of a larger body, for example an annular body.

In the present case, the carrier body 5 is shown as a hollow body, but can also be configured as a solid body. If it is configured as a hollow body, a magnetic core can also be inserted into the carrier body 5.

To adjust the inductance of the component 1, the wire winding 3 is surrounded by a magnetic foil 2. The foil 2 is wrapped to form a foil wrap 13. The foil 2 comprises a magnetic material. The foil 2 is in particular not or only slightly electrically conductive. An insulating layer can optionally be disposed between the foil 2 and the wire winding 3. The insulating layer can comprise a plastic, for example.

The foil 2 allows a precise adjustment of the inductance of the component 1 after the wire winding 3 has been produced. The foil 2 can be wrapped around the wire winding 3 in a suitable number of turns depending on the desired target value of the inductance. In the present case, the foil wrap 13 comprises four complete turns, so that four layers 18, 19, 20, 21 lie one over the other. The foil 2 can also comprise a different number of layers, for instance between 1 and 10 layers. It is also possible for the foil to comprise more than 10 layers. The foil 2 is in particular present in its basic form even prior to wrapping the component 1. The foil 2 is provided in the form of a roll, for example, unwrapped and wrapped around the base body 6. The foil 2 can, for example, also be provided in the form of a strip.

The foil wrap 13 forms a magnetic body outside the winding. The number of turns determines the magnetic thickness of the foil wrap 13. Due to its magnetic shielding effect, the foil wrap 13 can also be referred to as a shield winding.

The foil wrap 13 in particular has the shape of a tube arranged around the base body 6. The foil wrap 13 completely covers the wire winding 3 toward the outside, in particular in a direction radially outward from a winding axis. The wire ends 14, 15 of the wire 4 project from the wrapped foil 2.

For instance, the foil wrap 13 does not completely cover the length of the carrier body 5.

The outside of the foil wrap 13 can be surrounded by electrical shielding 16. The shielding 16 is in the form of a further foil or a coating, for example. The shielding 16 comprises a conductive material, for example a metal. An additional non-conductive foil can optionally be disposed over the shielding 16 for fixation.

Figure 3:
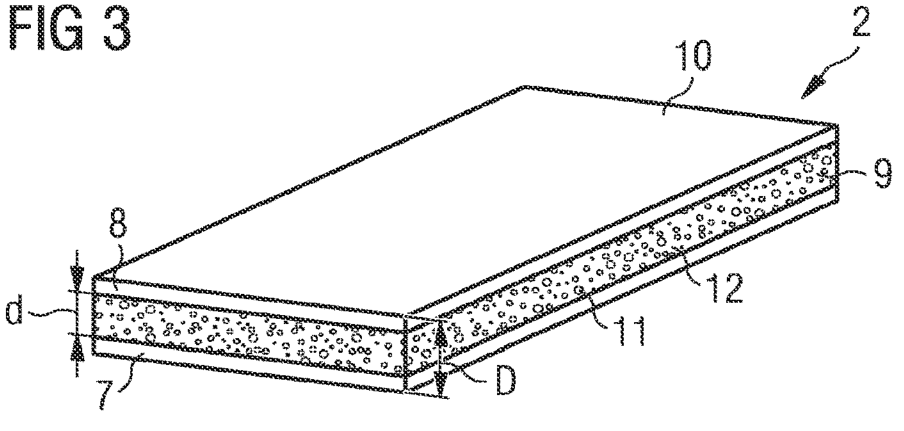
FIG. 3 shows a foil for wrapping the base body of FIG. 2.

FIG. 3 shows an example of a magnetic foil 2 for adjusting the inductance. The basic form of the foil 2 is present before and after wrapping the base body 6. The foil 2 is provided prior to wrapping as a roll, for example, or as a strip.

In the present case, the foil 2 comprises two carrier layers 7, 8 and an interposed magnetic layer 9. The foil 2 is consequently multilayered.

Instead of two carrier layers 7, 8, there can also be only one carrier layer or no carrier layer at all. The use of only one carrier layer or no carrier layer has the advantage that the total thickness of the foil 2 is smaller.

The carrier layers 7, 8 are non-magnetic, for instance, and serve to stabilize the magnetic layer 9. The carrier layers 7, 8 can in particular comprise plastic or be made of plastic. The carrier layers 7, 8 can also comprise an adhesive, in particular a cured adhesive.

The magnetic layer 9 comprises a non-magnetic material 12 filled with magnetic particles 11, for example. The non-magnetic material 12 can be a plastic, for example. The magnetic material 12 can also be an adhesive. The thickness d of the magnetic layer 9 is also referred to as the magnetic thickness of foil 2. The total thickness D of the foil consists of the thickness of the carrier layers 7, 8 and the thickness d of the magnetic layer 9. The maximum thickness of the foil 2 is 100 μm, for example.

Ferrite, for instance, is a suitable material for the magnetic particles 11. Depending on the desired properties, it is also possible to use pure iron or an amorphous or nanocrystalline iron alloy. The material can be in powder form. It can in particular also be a highly permeable material, for instance having a permeability of $\mu>1000$.

The magnetic layer 9 can alternatively also be made entirely or primarily of the magnetic material. The magnetic layer 9 can in particular comprise only the magnetic material and no non-magnetic carrier material. The magnetic material is in particular not in the form of individual particles, but rather as a continuous layer. The magnetic layer 9 is in the form of an iron strip, for example. The strip can be made of ferrite, pure iron or an iron alloy, for example.

The carrier layers 7, 8 are particularly advantageous when using brittle magnetic layers 9, for instance an iron strip. Some highly permeable materials in particular exhibit a high degree of brittleness. The carrier layers 7, 8 make it possible to maintain the shape and the magnetic properties if cracks occur in the magnetic layer 9. For less brittle magnetic layers 9, a foil 2 without a carrier layer can also be used. It is also possible for an adhesive, which can also be used to attach the foil 2 to the component 1, to ensure the stability of the foil 2 in the event of cracks. In this case, too, the foil 2 can be configured without an additional carrier layer 7, 8, even when using a brittle magnetic layer 9.

The magnetic layer 9 can also be made of a plurality of sublayers. Each of the sublayers can have the structure of the magnetic layer 9 described above. The sublayers are glued together, for example. In this way, the thickness d of the magnetic layer 9 in the foil 2 can be adjusted.

The selection of the thickness d of the magnetic layer 9 can thus be used to determine how strongly one turn of the foil 2 around the base body 6 affects the inductance of the component 1.

For example, for a thick version with many sublayers of the magnetic layer 9, for instance 20 sublayers, the same magnetic thickness can be achieved by applying one single turn as can be achieved in a version with a single-layer magnetic layer 9 when applying many turns, for instance 20 turns. The total thickness of the foil wrap 13 can then vary greatly depending on the number of carrier layers 7, 8.

The magnetic layer 9 is, for example, connected to the carrier layers 7, 8 by means of a bonding agent, for instance an adhesive. The magnetic layer 9 can also be connected to the carrier layers 7, 8 via a purely thermal process.

The foil 2 has a bonding agent 10 on one surface, for example, in particular an adhesive. The bonding agent 10 can also be applied to both surfaces. The foil 2 can thus be attached to the base body 6 in a self-adhesive manner. The bonding agent 10 can alternatively also be applied later to the base body 6 and/or the foil 2. The layers 18, 19, 20, 21 can also be attached to one another by means of the bonding agent 10. The foil 2 can be flexible, for example, like an adhesive tape.

FIGS. 4A to 4E show method steps for adjusting an inductance of an inductive component, for example the inductive component 1 according to FIG. 1.

Figure 4A:
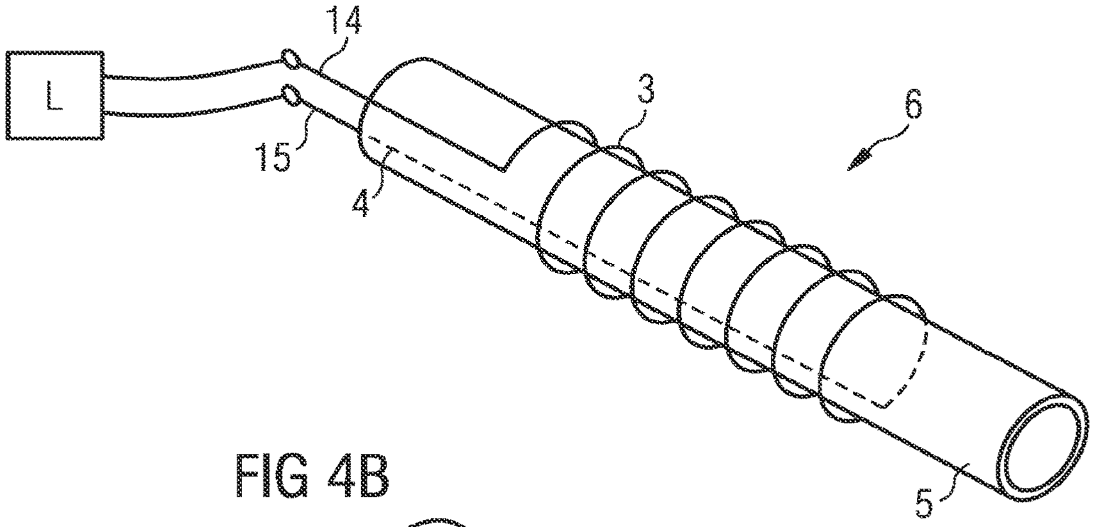
FIGS. 4A to 4E show steps of a method for adjusting an inductance in a schematic illustration.

According to FIG. 4A, a base body 6 is provided, which comprises a winding 3 of a wire 4. The base body 6 can be configured according to FIG. 2. Through measurement, the inductance L of the base body 6 can be determined.

Figure 4B:
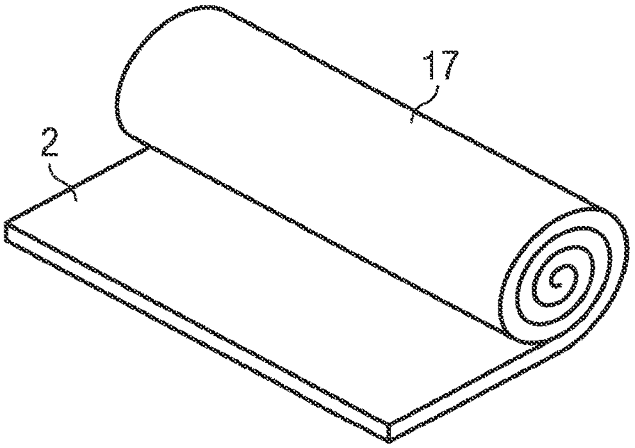

According to FIG. 4B, a foil 2 is provided. The foil 2 has the structure according to FIG. 3, for example. The foil 2 can also comprise a magnetic layer which is formed over its entire volume by a magnetic Material. The foil 2 can be constructed with or without carrier layers.

The foil 2 is provided in the form of a roll 17, for instance. The foil 2 can be self-adhesive. If the foil 2 is self-adhesive, the adhesive surface can be covered by a protective foil that is later removed before applying the foil. If the foil 2 is not self-adhesive, a bonding agent, in particular an adhesive, can be applied.

Figure 4C:
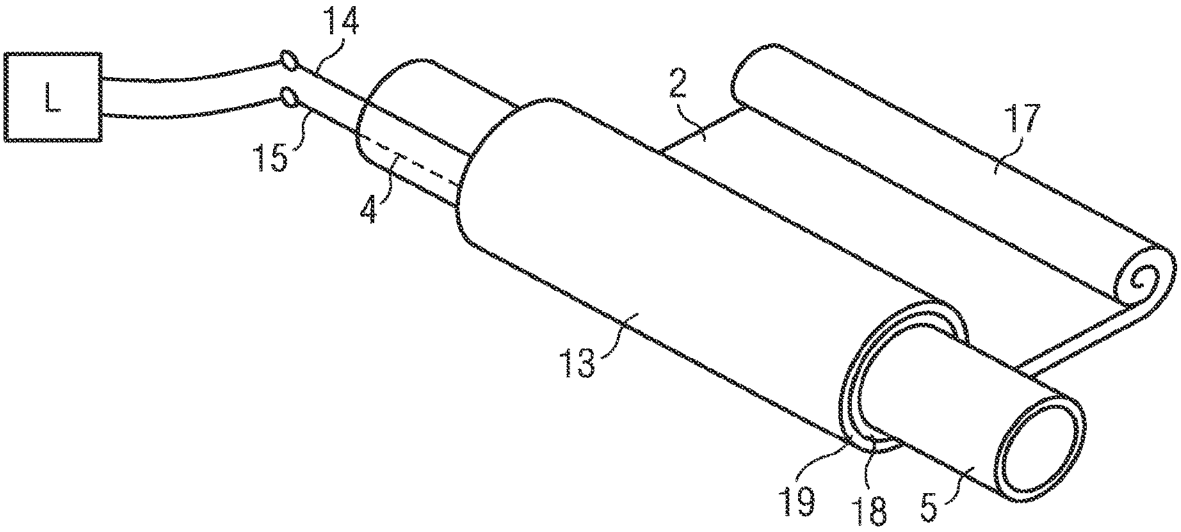

According to FIG. 4C, the foil 2 is wrapped around the base body 6. The number of turns of the obtained foil wrap 13 is determined, for example, as a function of the deviation of the measured inductance from a target value of the inductance. In the present case, two turns, corresponding to the two layers 18, 19, are applied in a first step. Optionally, an insulating layer can be applied over the wire winding 3 before the foil 2 is applied.

The foil 2 can be cut to the desired length before or after wrapping. A portion of the foil 2, in particular the roll 17, can project from the foil wrap 13 as shown, and not be cut off until the target value of the inductance has been reached.

The inductance L of the component 1 can be determined after or even during the wrapping process. If the inductance value corresponds to the target value and a portion of the foil 2 still projects, this portion of the foil 2 is cut off. The number of turns can now be set for a group of identical components, so that there is no need for measurement during production of these components.

If the measured value is below a target value, more of the foil 2 is wrapped around the base body 6 or a different foil 2 is wrapped around the base body 6.

Overall, the magnetic thickness and thus the inductance can be adjusted very precisely by adding further turns to the foil wrap 13. For example, depending on the required thickness of the foil wrap 13, the thickness can be varied in small increments, for example in 2.5% increments.

It is also possible to apply partial turns. For example, the foil can be wrapped around the base body 6 in 1.5 turns.

If the measured value is above the target value, the number of turns can be reduced or a foil 2 having a smaller thickness of the magnetic layer 9 can be used.

In the present case, the measured inductance is not yet sufficiently close to the target value, so the foil 2 is wrapped further around the base body 6.

Figure 4D:
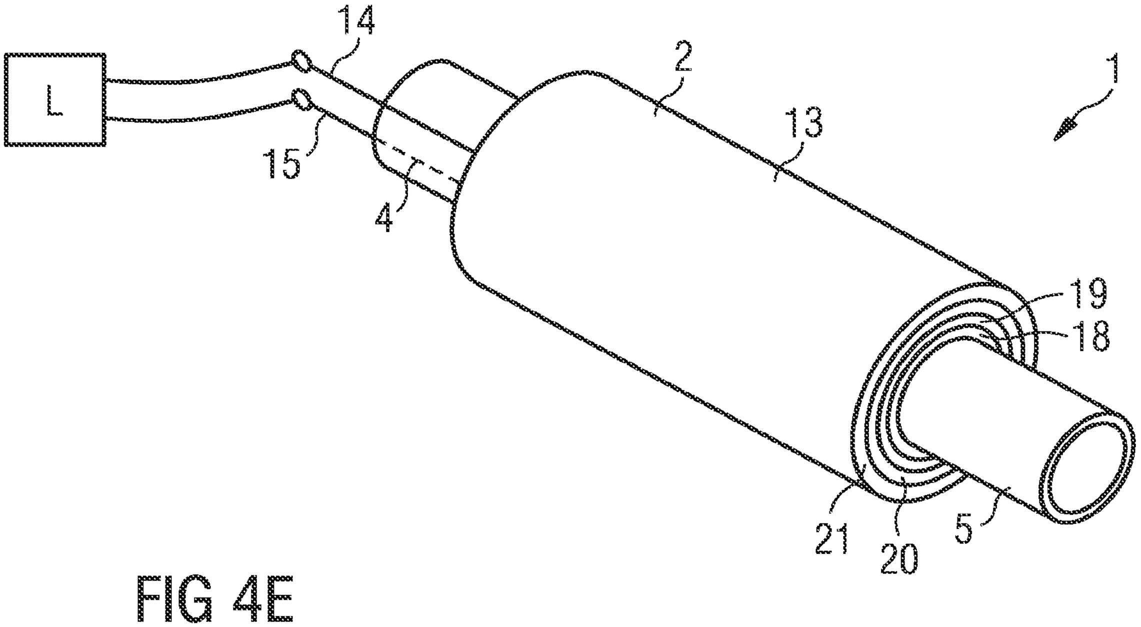

According to FIG. 4D, two further turns, corresponding to two further layers 20, 21 of the foil 2, are now wrapped around the base body 6. The inductance can then be measured again. Since a target value has now been reached, the remainder of foil 2 is cut off. If the desired inductance has not yet been reached, the wrapping process can be continued.

Figure 4E:
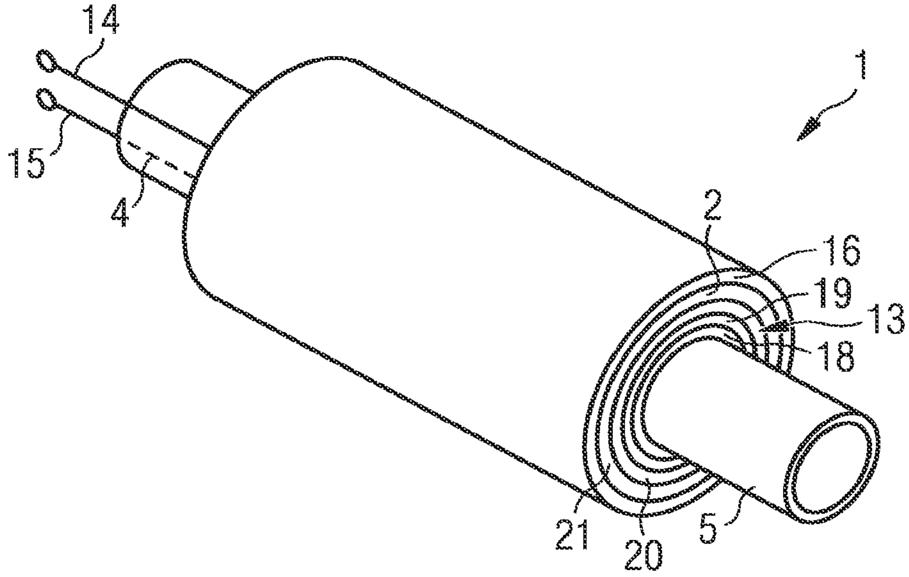

Lastly, according to FIG. 4E, an electrical shielding 16 can optionally be applied over the foil wrap 13.

The foil wrap 13 is wrapped with one or more layers of another metal foil, for example, or coated with a metallic material. For example, a metallic foil, such as copper foil, aluminum foil or tinned copper foil, is applied over the magnetic foil.

An additional foil for improved fixation is disposed on the outside, for example (not depicted).

LIST OF REFERENCE SIGNS

1 Component
2 Foil
3 Winding
4 Wire
5 Carrier body
6 Base body
7 Carrier layer
8 Carrier layer
9 Magnetic layer
10 Bonding agent
11 Magnetic particle
12 Non-magnetic material
13 Foil wrap
14 Wire end
15 Wire end
16 Electrical shielding
17 Roll
18 Layer
19 Layer
20 Layer
21 Layer
d Thickness of the magnetic layer
D Thickness of the foil

The invention claimed is:

1. An inductive component, comprising:
a wire winding, around which a magnetic foil is wrapped;
an electrical shielding, which surrounds the magnetic foil,
wherein the magnetic foil comprises a magnetic layer and two non-magnetic carrier layers in addition to the magnetic layer,
wherein the magnetic layer is made entirely of a magnetic material,
wherein the magnetic layer is disposed between the two non-magnetic carrier layers, and
wherein the magnetic material is a nanocrystalline iron alloy; and
a non-magnetic and non-conductive insulating layer, which comprises a plastic and which is disposed between the magnetic foil and the wire winding.

2. The inductive component according to claim 1, wherein the magnetic foil is self-adhesive.

3. The inductive component according to claim 1, wherein the magnetic foil is wrapped around the wire winding in a plurality of layers.

4. The inductive component according to claim 1, further comprising a magnetic core disposed within the wire winding.

5. The inductive component according to claim 1, wherein there is no magnetic core within the wire winding.

6. The inductive component according to claim 1, wherein the magnetic foil has a maximum thickness of 100 μm.

7. A method for adjusting an inductance value of an inductive component, the method comprising:
providing a wire winding;
applying a non-magnetic and non-conductive insulating layer comprising a plastic over the wire winding;

wrapping the wire winding and the insulating layer with a magnetic foil, wherein the magnetic foil comprises a magnetic layer and two non-magnetic carrier layers in addition to the magnetic layer, wherein the magnetic layer is made entirely of a magnetic material, wherein the magnetic material is a nanocrystalline iron alloy, wherein the magnetic layer is disposed between the two non-magnetic carrier layers; and applying, after wrapping the magnetic foil, an electrical shielding over the wrapped magnetic foil.

8. The method according to claim 7, wherein a number of layers of the wrapped magnetic foil or a thickness of a magnetic layer of the wrapped magnetic foil is selected as a function of a target value of an inductance.

9. The method according to claim 7, wherein the inductance of the inductive component is measured before and/or after the step of wrapping with the magnetic foil, and wherein a number of layers of the wrapped magnetic foil is changed as a function of a deviation of a measured value from a target value.

10. The method according to claim 9, wherein, during the measurement, the magnetic foil is wrapped around the wire winding with a portion of a length of the magnetic foil and extends from the wrapped magnetic foil with a further portion of the length of the magnetic foil, and wherein, after the measurement, the magnetic foil is wrapped further onto the wire winding.

11. The method according to claim 7, wherein an extending portion of the magnetic foil is cut off after the magnetic foil has been wrapped.

* * * * *